United States Patent
Zopf et al.

(10) Patent No.: US 11,264,049 B2
(45) Date of Patent: *Mar. 1, 2022

(54) SYSTEMS AND METHODS FOR CAPTURING NOISE FOR PATTERN RECOGNITION PROCESSING

(71) Applicant: Cypress Semiconductor Corporation, San Jose, CA (US)

(72) Inventors: Robert Zopf, Rancho Santa Margarita, CA (US); Victor Simileysky, San Jose, CA (US); Ashutosh Pandey, Irvine, CA (US); Patrick Cruise, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 16/386,016

(22) Filed: Apr. 16, 2019

(65) Prior Publication Data

US 2019/0304486 A1    Oct. 3, 2019

Related U.S. Application Data

(63) Continuation of application No. 16/016,344, filed on Jun. 22, 2018, now Pat. No. 10,332,543.

(Continued)

(51) Int. Cl.
*G10L 25/78* (2013.01)
*G10L 15/22* (2006.01)
(Continued)

(52) U.S. Cl.
CPC ............ *G10L 25/78* (2013.01); *G06F 3/165* (2013.01); *G10L 15/08* (2013.01); *G10L 15/22* (2013.01);
(Continued)

(58) Field of Classification Search
CPC ... G06F 3/165; G10L 15/08; G10L 2015/088; G10L 15/22; G10L 15/28; G10L 19/022;
(Continued)

(56) References Cited

U.S. PATENT DOCUMENTS 4,038,495 A * 7/1977 White ............... G10L 19/06
704/220
5,459,814 A * 10/1995 Gupta ............... G10L 25/78
704/214

(Continued)

FOREIGN PATENT DOCUMENTS

CN        106385655 A      2/2017
CN        103472960 B  *  6/2017
(Continued)

OTHER PUBLICATIONS

US 9,460,710 B2, 10/2016, Meisel (withdrawn)
(Continued)

*Primary Examiner* — Eric Yen (57) ABSTRACT

Systems and methods provide a first sample of audio data and detect speech onset in the first sample of the audio data. Responsive to detecting the speech onset, systems and methods switch from capturing second samples of the audio data at first intervals, to capturing the second samples of the audio data at second intervals. Systems and methods provide contiguous audio data using the second samples of the audio data captured at the first intervals and at least one captured portion of the second samples of the audio data captured at the second intervals.

17 Claims, 9 Drawing Sheets

Related U.S. Application Data (60) Provisional application No. 62/641,767, filed on Mar. 12, 2018.

(51) Int. Cl.

| | | |
|---|---|---|
| *G10L 15/08* | (2006.01) | |
| *G10L 15/28* | (2013.01) | |
| *G10L 19/022* | (2013.01) | |
| *G06F 3/16* | (2006.01) | |

(52) U.S. Cl.
CPC ............ *G10L 15/28* (2013.01); *G10L 19/022* (2013.01); *G10L 2015/088* (2013.01); *G10L 2025/786* (2013.01)

(58) Field of Classification Search
CPC ............... G10L 25/78; G10L 2025/783; G10L 2025/786
See application file for complete search history.

(56) References Cited

U.S. PATENT DOCUMENTS

| | | | |
|---|---|---|---|
| 5,978,763 A | 11/1999 | Bridges | |
| 5,983,186 A * | 11/1999 | Miyazawa | G10L 15/26 704/233 |
| 6,502,073 B1 | 12/2002 | Guan et al. | |
| 7,343,284 B1 | 3/2008 | Gazor et al. | |
| 7,917,356 B2 | 3/2011 | Chen et al. | |
| 9,076,447 B2 | 7/2015 | Nandy et al. | |
| 9,349,386 B2 | 5/2016 | Adams et al. | |
| 9,398,367 B1 * | 7/2016 | Scott | H04R 1/1083 |
| 9,478,231 B1 * | 10/2016 | Soman | G06F 1/3206 |
| 9,484,030 B1 * | 11/2016 | Meaney | H04R 3/005 |
| 9,495,956 B2 | 11/2016 | Meisel et al. | |
| 9,685,156 B2 | 6/2017 | Borjeson et al. | |
| 9,767,828 B1 | 9/2017 | Velusamy et al. | |
| 10,027,662 B1 * | 7/2018 | Mutagi | G10L 15/22 |
| 10,176,809 B1 * | 1/2019 | Pierard | G10L 15/18 |
| 10,297,250 B1 * | 5/2019 | Blanksteen | G10L 21/02 |
| 10,649,727 B1 * | 5/2020 | Douglas | G06F 3/167 |
| 10,692,489 B1 * | 6/2020 | Grizzel | G10L 15/18 |
| 10,847,149 B1 * | 11/2020 | Mok | G10L 15/08 |
| 2002/0010578 A1 * | 1/2002 | Padmanabhan | G10L 15/02 704/231 |
| 2002/0116197 A1 * | 8/2002 | Erten | G06K 9/6293 704/273 |
| 2002/0138255 A1 * | 9/2002 | Endo | G10L 25/69 704/208 |
| 2003/0179888 A1 | 9/2003 | Burnett et al. | |
| 2004/0083095 A1 | 4/2004 | Ashley et al. | |
| 2004/0166820 A1 | 8/2004 | Sluijter et al. | |
| 2005/0075869 A1 * | 4/2005 | Gersho | G10L 19/173 704/223 |
| 2008/0040109 A1 * | 2/2008 | Muralidhar | G10L 25/87 704/233 |
| 2008/0167868 A1 | 7/2008 | Kanevsky et al. | |
| 2011/0264447 A1 | 10/2011 | Visser et al. | |
| 2012/0177220 A1 * | 7/2012 | Nakamura | G10L 19/008 381/94.1 |
| 2012/0323585 A1 | 12/2012 | Elias | |
| 2014/0122078 A1 * | 5/2014 | Joshi | G06F 1/3206 704/251 |
| 2014/0222436 A1 | 8/2014 | Binder et al. | |
| 2014/0237277 A1 * | 8/2014 | Mallinson | G06F 3/017 713/323 |
| 2014/0244273 A1 * | 8/2014 | Laroche | G06F 1/3206 704/275 |
| 2014/0257821 A1 | 9/2014 | Adams et al. | |
| 2014/0270197 A1 | 9/2014 | Krishnamurthy et al. | |
| 2014/0278435 A1 * | 9/2014 | Ganong, III | G10L 15/22 704/275 |
| 2014/0343935 A1 | 11/2014 | Jung et al. | |
| 2014/0358552 A1 | 12/2014 | Xu | |
| 2015/0051906 A1 * | 2/2015 | Dickins | G10L 25/78 704/210 |
| 2015/0221307 A1 | 8/2015 | Shah et al. | |
| 2015/0269954 A1 * | 9/2015 | Ryan | G10L 15/28 704/233 |
| 2015/0340042 A1 * | 11/2015 | Sejnoha | H04M 1/724 704/275 |
| 2016/0189706 A1 * | 6/2016 | Zopf | G06F 1/3231 713/320 |
| 2016/0196838 A1 * | 7/2016 | Rossum | H04R 29/004 381/97 |
| 2016/0284363 A1 * | 9/2016 | Von Borstel | G06F 3/015 |
| 2017/0031420 A1 | 2/2017 | Wong et al. | |
| 2017/0133023 A1 * | 5/2017 | Disch | G10L 19/24 |
| 2017/0133041 A1 | 5/2017 | Mortensen et al. | |
| 2018/0047386 A1 | 2/2018 | Garner et al. | |
| 2018/0174583 A1 * | 6/2018 | Zhao | G10L 15/22 |
| 2020/0265861 A1 * | 8/2020 | Yasura | G06F 7/22 |

FOREIGN PATENT DOCUMENTS

| | | | |
|---|---|---|---|
| CN | 111199733 A * | 5/2020 | |
| CN | 112259128 A * | 1/2021 | |
| WO | 2014144579 A1 | 9/2014 | |

OTHER PUBLICATIONS

S. Dixon, "Onset Detection Revisited", Sep. 18-20, 2006, Proc. of the 9th Int. Conference on Digital Audio Effects (DAFx'06), Montreal, Canada, (Year: 2006).*

Stowell, D and Plumbley, M, "Adaptive whitening for improved real-time audio onset detection", 2007, In: International Computer Music Conference (ICMC) 2007, Aug. 27, 2007-Aug. 31, 2007, Copenhagen, Denmark (Year: 2007).*

Graf, S., Herbig, T., Buck, M., & Schmidt, G., "Features for voice activity detection: A comparative analysis.", 2015, EURASIP Journal on Advances in Signal Processing, 2015, 1-15. doi:http://dx.doi.org/10.1186/s13634-015-0277-z (Year: 2015).*

Google Patents English Translation of CN-103472960-B, publication year of CN-103472960-B is 2017 (Year: 2017).*

"Always-Listening, Voice Trigger Solution" ON Semiconductor, onsemi.com [online], Mar. 2018, pp. 1-11; 11 pages.

International Search Report for International Application No. PCT/US2019/15211 dated Apr. 15, 2019; 2 pages.

USPTO Non-Final Rejection for U.S. Appl. No. 16/016,344 dated Nov. 27, 2018; 25 pages.

USPTO Notice of Allowance for U.S. Appl. No. 16/016,344 dated Feb. 19, 2019; 12 pages.

USPTO Notice of Allowance for U.S. Appl. No. 16/016,344 dated May 3, 2019; 9 pages.

USPTO Restriction Requirement for U.S. Appl. No. 16/016,344 dated Sep. 12, 2018; 7 pages.

Written Opinion of the International Searching Authority for International Application No. PCT/US2019/15211 dated Apr. 15, 2019; 7 pages.

* cited by examiner

SYSTEMS AND METHODS FOR CAPTURING NOISE FOR PATTERN RECOGNITION PROCESSING

RELATED APPLICATIONS

This application is a continuation application of U.S. Non-Provisional application Ser. No. 16/016,344, filed on Jun. 22, 2018, which claims the priority and benefit of U.S. Provisional Application No. 62/641,767, filed Mar. 12, 2018, which are incorporated by reference herein in their entirety.

TECHNICAL FIELD

The subject matter relates to the field of pattern recognition solutions. More specifically, but not by way of limitation, the subject matter discloses techniques for capturing noise for pattern recognition processing.

BACKGROUND

Devices with "always-on" or "always listening" voice interface capabilities, such as voice-enabled digital assistants, smart speakers, and hands-free interfaces traditionally require constant power, which either drains battery power or requires an electrical outlet. Portions of devices with speech recognition capabilities may remain in a low power consumption mode until speech like sounds are detected at which point phrase detection can determine whether a specific word or phrase has been spoken (i.e., a wake phrase). The implementation of wake phrase detection results in increased power consumption due to portions of the device remaining in a powered state over long periods of time (e.g., "always on").

BRIEF DESCRIPTION OF THE DRAWINGS

Some embodiments are illustrated by way of example and not limitation in the figures of the accompanying drawings in which.

DETAILED DESCRIPTION

Systems and methods for capturing noise for pattern recognition are described. In the following description, for purposes of explanation, numerous examples and embodiments are set forth in order to provide a thorough understanding of the claimed subject matter. It will be evident to one skilled in the art that the claimed subject matter may be practiced in other embodiments. Some embodiments are now briefly introduced and then discussed in more detail along with other embodiments beginning with FIG. 1.

Smart speakers, hearing aids, voice controlled hubs, mobile phones, white goods and industrial machinery are examples of products that are increasingly voice interface capable. Systems providing "always-on" or "always listening" voice interface capabilities may include multiple power domains that can each operate in one or more power consumption states. For example, a wake phrase detection power domain may remain in a low power consumption mode until a speech onset detection power domain detects speech like sounds. At that point the wake, up phrase detection power domain is transitioned to an active mode to perform wake up phrase detection. A typical wake up phrase detector (WUPD) requires the noise (e.g., the leading noise or background noise) that precedes the wake phrase so that it can process the entire wake phrase and for noise statistics estimation. In existing techniques, system power is dominated by the speech onset detection power domain because its microphones must remain always on, its digitizing circuitry must always provide high quality audio, and its memory buffer must always be powered, managed, and capturing the background noise for the WUPD.

Embodiments described herein can reduce power consumed by an audio processing device by periodically capturing the background noise for later use by the WUPD while providing speech recognition rates comparable to those provided by devices that constantly and repeatedly capture background noise. Consequently, a microphone of the disclosed audio processing device need not be fully powered at all times and the speech onset detector (SOD) can perform speech onset detection using lower quality audio data than is used by the WUPD. In embodiments, periodically captured background noise can also be used to determine whether an activation threshold of the microphone should be adjusted to avoid unnecessary power consumption by the SOD. Compared to prior techniques, embodiments can enable "always on" or "always listening" functionality with lower power consumption. These and other embodiments are described in further detail herein.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

Figure 1:
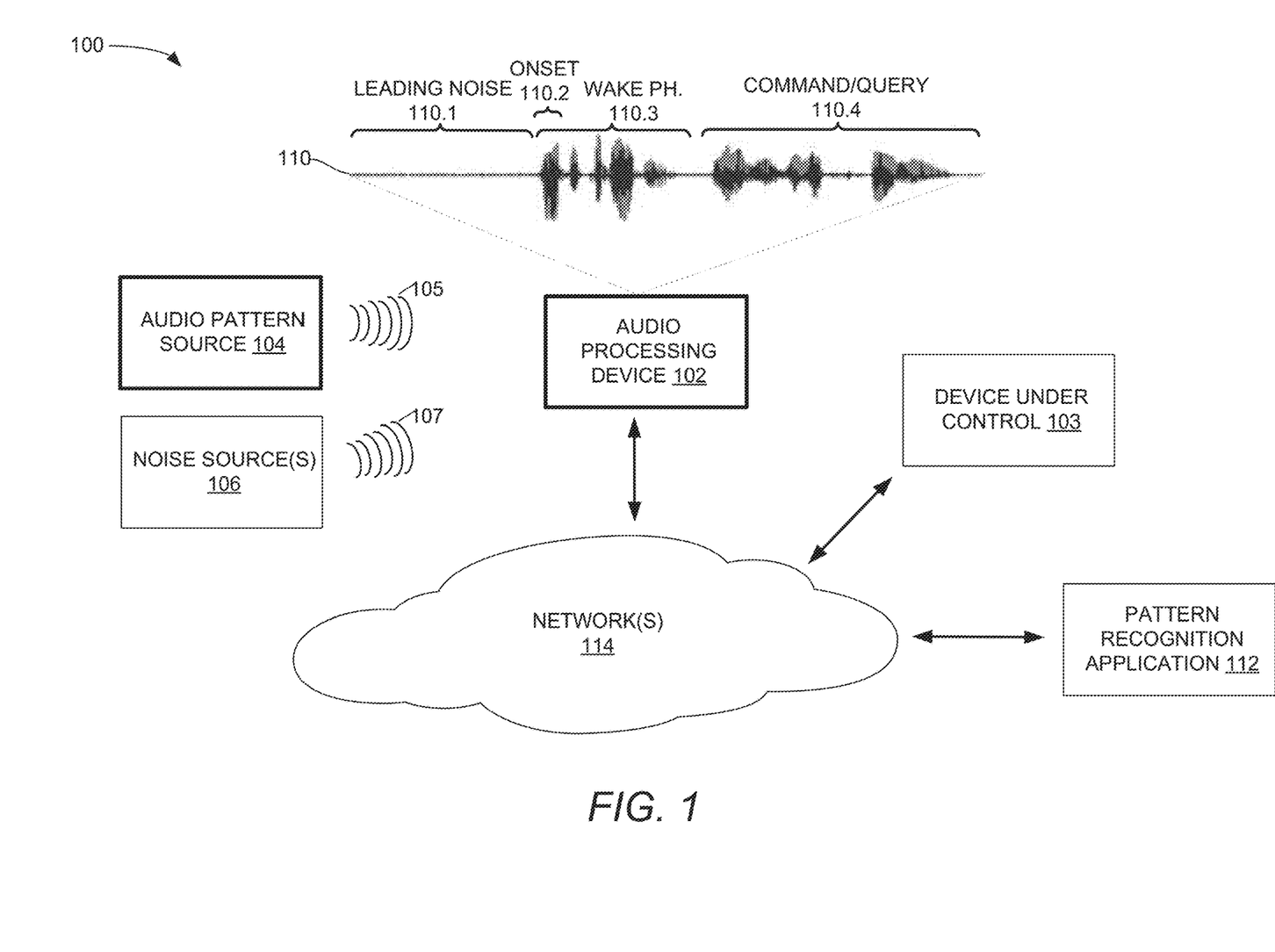
FIG. 1 is a block diagram illustrating a networked audio processing device, in accordance with various embodiments.

FIG. 1 is a block diagram 100 illustrating a networked audio processing device 102, in accordance with various embodiments. The audio processing device 102 is shown to be coupled to the pattern recognition application 112 and the device under control 103 through the network(s) 114. The audio processing device 102 is to facilitate audio pattern recognition by processing audio data 110 that is generated based on one or more of the sound waves 105 and 107 (e.g. audio signals) received from the audio pattern source 104 and the noise sources 106, respectively. As will be described in further detail below, the audio processing device 102 may facilitate audio pattern recognition by determining whether the wake phrase 110.3 has been uttered. In some embodiments, the audio processing device 102 may also recognize and/or process the query or command 110.4 that follows the wake phrase 110.3. The audio processing device 102 need not be coupled to the network(s) 114 to implement embodiments described herein.

The audio pattern source 104 provides the sound waves 105 that correspond to a recognizable audio pattern. In embodiments, an audio pattern is a predetermined audio pattern and/or an audio pattern that is recognizable by a pattern recognition application associated with the audio processing device 102. The audio pattern source 104 may be animate (e.g., human) or an inanimate object or objects (e.g., a machine).

Noise sources 106 provide the sound waves 107 that do not correspond to the recognizable audio pattern or the sound waves 105. The noise sources 106 may also be animate or inanimate and may include environmental ambient noise from loudspeakers, televisions, video games, street traffic noise, human speakers, industrial, or any other noise sources that generate ambient noise.

Network(s) 114 may include one more types of wired and/or wireless networks for communicatively coupling the network nodes of FIG. 1 to one another. For example, and not limitation, network(s) 114 may include a wireless local area network (WLAN) (e.g., Wi-Fi, 802.11 compliant), PANs (e.g., Bluetooth SIG standard or Zigbee, IEEE 802.15.4 compliant), and the Internet. In an embodiment, the audio processing device 102 is communicatively coupled to the pattern recognition application 112 through Wi-Fi and the Internet and coupled to the device under control 103 through Bluetooth and/or Wi-Fi.

Pattern recognition application 112 operates to recognize audio patterns and associate the recognized audio patterns with a corresponding meaning. The pattern recognition application 112 may reside on one or more computing devices coupled to the network(s) 114 over the link(s) and use or be implemented using processors, memory, circuitry, arithmetic logic, software, algorithms, and data structures to organize and process attributes of audible sound including pitch, volume, tone, repeating or rhythmic sounds and/or language sounds such as words, phrases, and the like. In some embodiments, the pattern recognition application 112 recognizes the command or query portion 110.4 of the audio data 110 in response to the audio processing device 102 detecting or recognizing the wake phrase 110.3 portion of the audio data 110. In other embodiments, the pattern recognition application 112 may be implemented on the audio processing device 102 itself.

In an embodiment, pattern recognition application 112 includes Automated Speech Recognition (ASR) technology, which identifies predetermined audio patterns and associates them with one another (e.g., using a data structure) and/or with corresponding meaning. Patterns recognizable by the pattern recognition application 112 may facilitate, for example and not limitation, music recognition, song recognition, voice recognition, image recognition, and speech recognition, or any other sensed pattern. In embodiments, the pattern recognition application 112 provides its results to the audio processing device 102, which may act on the command or query.

The device under control 103 is shown to be coupled to the network(s) 114 via the link(s). Device under control 103 may include any device with a function that can be initiated responsive to audio pattern recognition facilitated by the audio processing device 102. In some embodiments, the audio processing device controls the device under control 103 based on the results of audio pattern recognition performed by the pattern recognition application 112. Example devices under control include white goods, thermostats, lighting, automated blinds, automated door locks, automotive controls, windows, industrial controls and actuators. As used herein, devices under control may include any logic, firmware, or software application run by the device under control 103.

As introduced above, the audio processing device 102 may facilitate audio pattern recognition by processing audio data 110. The audio data is shown to include leading noise 110.1 (e.g., background noise), speech onset 110.2, a wake phrase 110.3, and a query or command 110.4. The leading noise 110.1 is audio data that corresponds to the sound waves 107 and includes the ambient noise in the environment that precedes onset 110.2. The speech onset 110.2, the wake phrase 110.3, and the query or command 110.4 are audio data that correspond to both the sound waves 105 (e.g., the speech to be recognized) and the sound waves 107 (e.g., ambient noise). Speech onset 110.2 is the beginning of speech in the audio data 110 and is shown to be a beginning portion or subset of the wake phrase 110.3. The wake phrase 110.2 is a predetermined phrase uttered by a user (e.g., "okay phone"). After having uttered the wake phrase 110.2, the user utters the query or command 110.3 (e.g., "unlock the door") to be acted upon (e.g., by the device under control 103).

To conserve power, the audio processing device 102 may only attempt detection of the wake phrase 110.3 if the audio processing device 102 has already detected speech onset 110.2. Similarly, speech recognition of the command or query 110.4 may only be attempted if the audio processing device 102 has detected the wake phrase 110.3. In previous "always listening" solutions, the audio processing device 102 continuously and repeatedly fills its buffer with the leading noise 110.1 (e.g., 250 ms of leading noise) for use in estimating noise (e.g., ambient noise) and avoiding phrase clipping. Avoiding phrase clipping means providing the wake phrase 110.3 for wake phrase detection without delay that cuts off or clips the start of the wake phrase 110.3. Phrase clipping would be caused by the delay in detecting speech onset and waking the WUPD. Consequently, the power domains of previous solutions that are associated with continuously and repeatedly filling the buffer remain in a power consuming active mode, regardless of whether any speech onset is detected. The estimated noise aids the audio processing device 102 in removing noise (e.g., ambient noise) from the wake phrase 110.3 for wake phrase detection. There can be significant power consumption involved with the continuous and repeated capture (e.g. sampling and buffering) of the leading noise 110.1, which may be especially impactful in a battery powered audio processing device. Furthermore, changes in ambient noise conditions can trigger false positives in speech onset detection.

In their investigation into solving these and other technical challenges, the inventors determined that in some environments, noise statistics (e.g., based on background noise 107) generally do not change significantly over a relatively short period (e.g., 10-30 s). Some noise transients may occur (e.g., a car horn) but this may be as likely to occur during the continuously filled leading noise buffer (e.g., 250 ms) as it is a short period earlier. The inventors discovered that sampling and buffering the noise at periodic intervals can provide a statistical sample of the noise that is sufficiently representative of the noise that was collected continuously and repeatedly in the previous techniques. The inventors also discovered that some amounts of clipping (e.g., up to 10 ms) may result in no degradation in wake phrase detection rate and that greater amounts (e.g., 10-20 ms) of clipping may occur before any significant degradation in detection rate. The inventors made use of their discoveries in devising the inventive technical systems, apparatus, and methods described herein which facilitate audio pattern recognition with reduced energy consumption compared to previous techniques, while providing at least comparable recognition rates.

Figure 2:
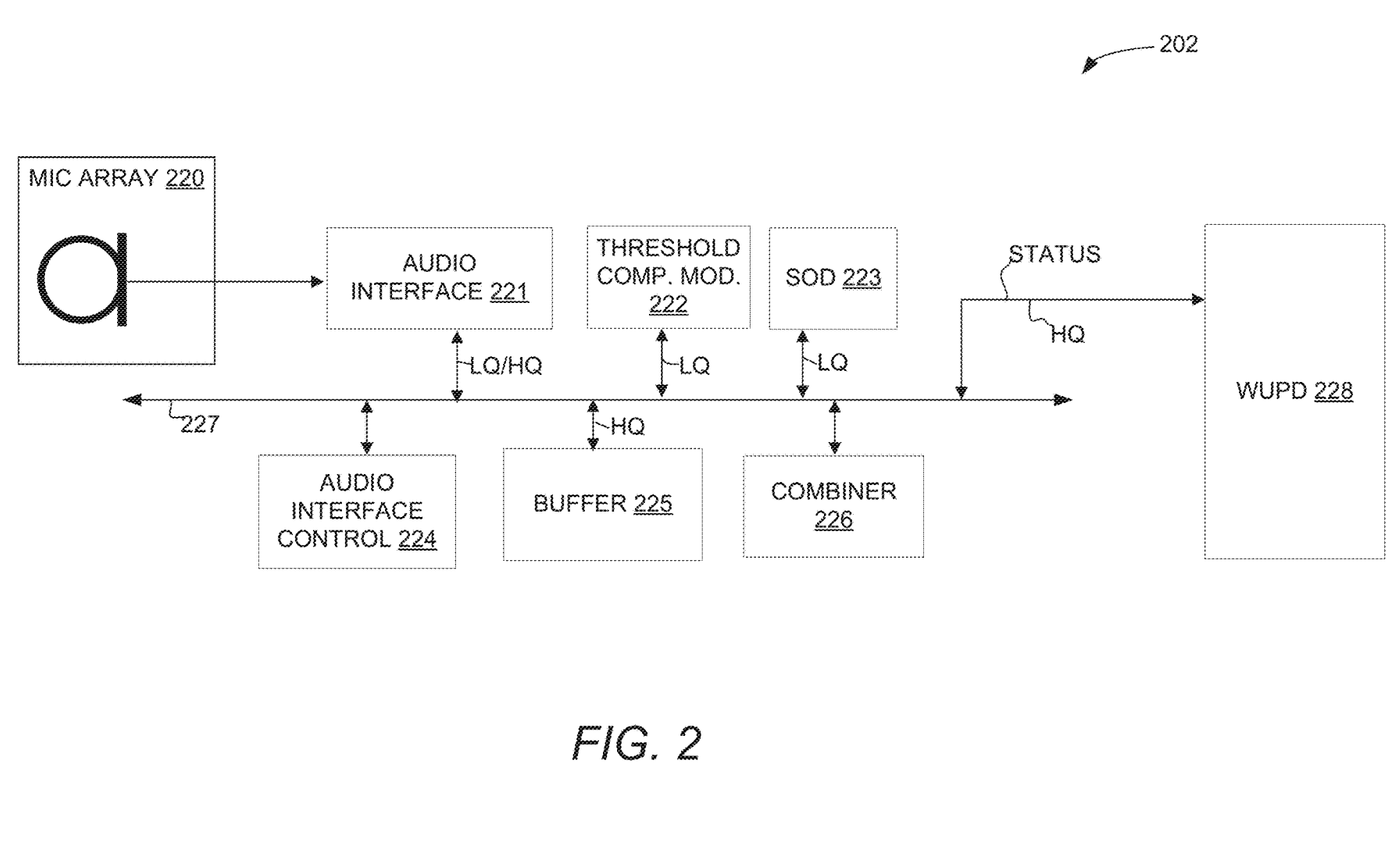
FIG. 2 is a block diagram illustrating components of an audio processing device, in accordance with embodiments.

FIG. 2 is a block diagram illustrating components of an audio processing device 202, in accordance with embodiments. The audio processing device 202 is shown to include functional blocks including a microphone array 220, an audio interface 221, threshold computation module 222, SOD 223, audio interface control 224, buffer 225, combiner 226, and WUPD 228. Each functional block may be coupled to bus system 227 (e.g., I2C, I2S) and be implemented using hardware (e.g., circuitry), instructions (e.g., software and/or firmware), or a combination of hardware and instructions. In one embodiment, some or all of the audio processing device 202 is implemented by circuitry in an integrated circuit device (i.e., on a single integrated circuit substrate) or in a single device package. In alternative embodiments, the components of the audio processing device 202 are distributed among multiple integrated circuit devices, device packages, or other circuitry.

The microphone array 220 is to receive sound waves such as 105 and 107 of FIG. 1. Each microphone of the microphone array 220 includes a transducer or other mechanism (e.g., a including a diaphragm) to convert the energy of sound waves into an electronic signal or digital signal (e.g., audio data). Microphone array 220 may include one or more microphones and is sometimes referred to herein as microphone 220. When the sound waves 105 and 107 are received during a common period, the audio data includes components that correspond to both the sound waves 105 and 107. In some embodiments, one or more microphones of the array 220 may be a digital microphone. The microphone array 220 may be part of the audio interface 221 or a separate peripheral device that is external to the audio processing device 202 but coupled to the bus system 227. In some embodiments, the microphone array may include threshold/hysteresis settings for activity detection and measurement and/or processing logic to determine whether a sound wave received by the microphone array 220 meets or exceeds an activation threshold and whether corresponding audio data should be passed on to the SOD 223 for processing. In various embodiments, the threshold level of activity may be an energy level, an amplitude, a frequency, or any other attribute of a sound wave. The microphone array 220 may be coupled to a memory that stores the activation threshold, which may be dynamically reprogrammable (e.g., by the threshold computation module 222).

Audio interface 221 includes circuitry to process and analyze the audio data received from the microphone array 220. In embodiments, audio interface 221 digitizes the electronic audio signals. Once digitized, audio interface 221 may provide signal processing (e.g., demodulation, mixing, filtering) to analyze or manipulate attributes of the audio data (e.g., phase, wavelength, frequency).

In one embodiment, the audio interface 221 includes a pulse density modulator (PDM) front end that is connected to the microphone array 220. In the PDM front end, the PDM generates a pulse density modulated bitstream based on an electronic signal from the microphone array 220. The PDM provides a clock signal to the microphone 220 that determines the initial sampling rate, then receives a data signal from the microphone 220 representing audio captured from the environment. From the data signal, the PDM generates a PDM bitstream and may provide the bitstream to a decimator, which can generate the audio data provided to the bus system 227 by either providing high quality audio data or by reducing a sample rate of the pulse density modulated bitstream from PDM to low quality audio data. In an alternative embodiment, the audio data source is an auxiliary analog to digital converter (AUX ADC) front end. In the auxiliary ADC front end, an analog to digital converter converts an analog signal from the microphone 220 to a digital audio signal. The digital audio signal may be provided to a decimator to generate the audio data provided to the bus system 227 by either providing high quality audio data or by reducing a sample rate of the digital audio signal from ADC to low quality audio data.

Audio interface control 224 is to control the timing of sampling by the audio interface 221 or the microphone array 220 and the sample rate of sampling by the audio interface 221 or the microphone array 220. For example, the audio interface control 224 may control the audio quality (e.g., sample rate) of audio data provided to the SOD 223 and to the buffer 225 and may also control the times at which such audio data should be provided periodically or continuously to the bus system 227. Although shown as a separate functional block, functionality of the audio interface control 224 may be performed by the SOD 223 and/or the buffer 225 or any other functional block. Alternatively, or additionally, the audio interface control 224 may reside in one or more of the power domains discussed below with respect to FIG. 3.

The SOD 223 is to determine whether audio data received from the audio interface 221 is speech onset. The SOD 223 may use any of the speech onset detection algorithms or techniques known to those have ordinary skill in the art. In an embodiment, audio data with a reduced sample rate (e.g., 2-4 kHz) is sufficient for detecting speech onset (or other sound onset event) while allowing the SOD 223 to be clocked at a lower frequency, thus reducing the power consumption and complexity of the SOD 223. Upon detecting a speech onset event, the SOD 223 asserts a status signal on the bus 227 to wake the WUPD 228 from a low power consumption state (e.g., sleep state) to a higher power consumption state (e.g., active state) to perform phrase detection, as will discussed further below.

Threshold computation module 222 monitors ambient noise to dynamically compute and potentially readjust the activation threshold of audio that should trigger speech onset detection to avoid unnecessary processing by the SOD 223. In an embodiment, the audio interface control 224 causes the audio interface 221 to provide audio data (e.g., ambient noise) to the threshold computation module 222 periodically at intervals. In an embodiment, the threshold computation module 222 may reset the activation threshold level from below the current level of ambient noise to above the current level of ambient noise.

The buffer 225 is to store periodically sampled leading noise audio data. In an embodiment, the buffer 225 is sized to store slightly more than 250 ms of audio data (e.g., 253 ms) to accommodate combining as discussed below. Alternatively or additionally, after the SOD 223 has detected speech onset, the buffer 225 may act as a channel to pass through the continuously sampled audio data comprising the wake phrase 110.3 and the command or query 110.4. In an embodiment, the audio interface control 224 causes the audio interface 221 to provide leading noise to the buffer 225 periodically at intervals. Once the SOD 223 has detected speech like sound, the audio interface control 224 may cause the audio interface 221 to provide the remaining audio data 110.2, 110.3, and 110.4 to the buffer continuously.

The combiner 226 is to generate contiguous audio data using the periodically captured leading noise 110.1 and the continuously captured the remaining audio data 110.2, 110.3, and 110.4. In an embodiment, the combiner 226 stitches a portion of an end of the last periodically captured audio data with a portion of the beginning of the continuously captured audio data. For example, the combiner 226 may use an overlap add operation to overlap 3 ms of the leading noise with the continuously captured audio data. The combiner 226 may output the contiguous audio data to the WUPD 228 via the bus system 227.

The WUPD 228 is to determine whether the contiguous audio data output by the combiner 226 includes a wake phrase. The WUPD 228 may include processing unit that, when the WUPD 228 is activated, performs higher complexity and higher-powered computations (e.g., relative to SOD 223) to determine whether a wake-up word or phrase has been spoken. The WUPD 228 makes this determination based on the audio data recorded in the buffer 225 (corresponding to a time prior to speech onset) and the high-quality audio data received after speech onset is detected.

Figure 3:
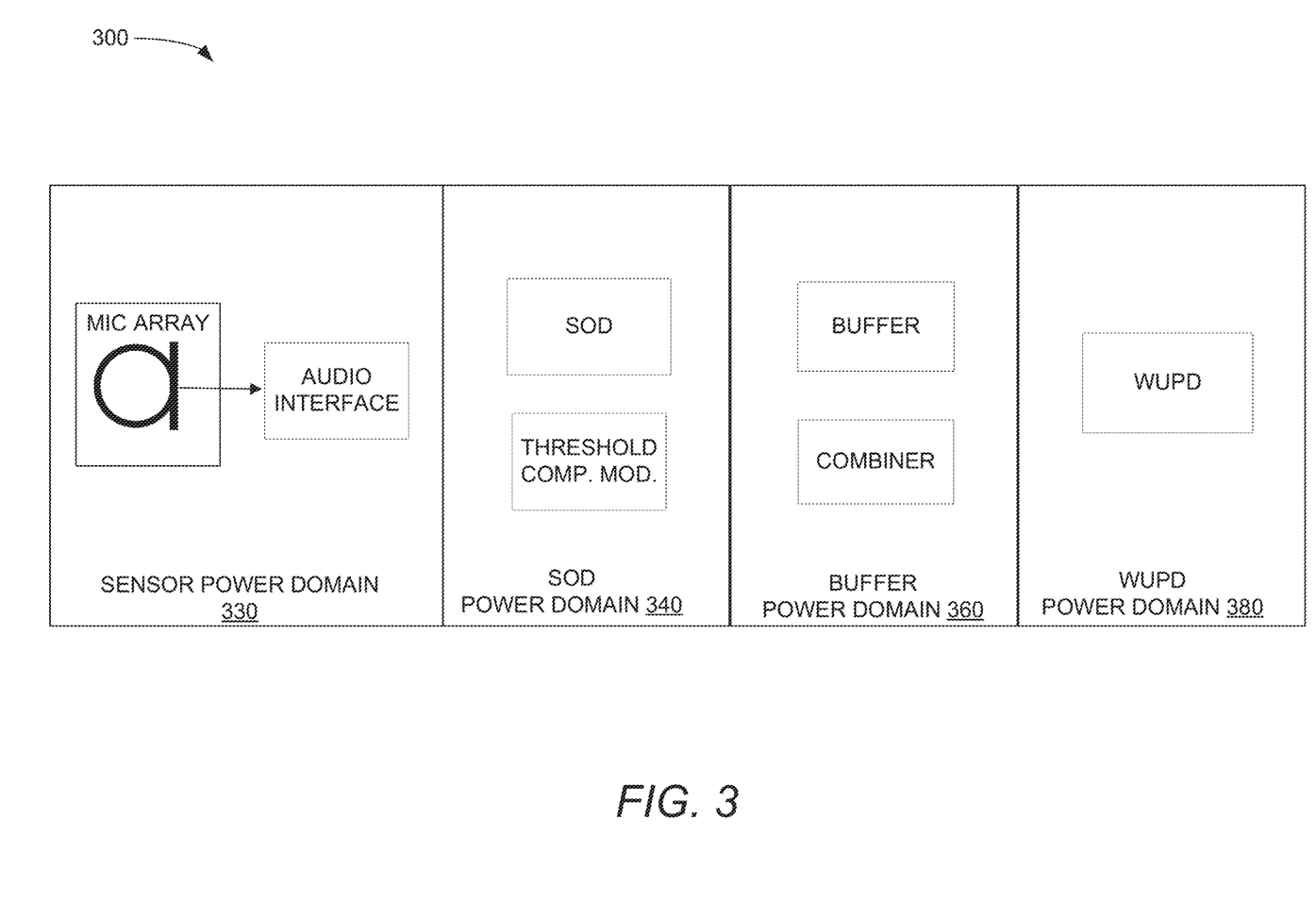
FIG. 3 is block diagram illustrating power domains of an audio processing device, in accordance with embodiments.

FIG. 3 is a block diagram illustrating power domains of an audio processing device 300, in accordance with embodiments. The power domains of the audio processing device 300 may operate in different power consumption modes at different times depending on demands of system operation. For example, and not limitation, a power domain may operate in an active mode, a monitoring mode, or a sleep mode. In embodiments, the active mode of a power domain may have a higher power consumption rate than the monitoring mode and the sleep mode.

The sensor power domain 330 is shown to include the microphone array and the audio interface. In embodiments, the sensor power domain 330 operates in a monitoring mode when the microphone array listens and monitors for audio activity that meets or exceeds an activation threshold. When the audio interface samples the audio data, the sensor power domain 330 operates in an active mode. The active mode may be considered a low quality active mode when the audio interface samples at lower sample rates (e.g., 2-8 kHz) and a high quality active mode when the audio interface samples a higher sample rates (e.g., greater than 8 kHz). In but one embodiment, the sensor power domain 330 operates in the monitoring mode approximately 98% of the time, the low quality active mode approximately 1% of the time and the high quality active mode approximately 1% of the time.

The SOD power domain 340 is shown to include the SOD and the threshold computation module. In embodiments, the SOD power domain 340 operates in an active mode when the threshold computation module is processing audio data to compute an updated activation threshold. When the threshold computation module is not processing audio data, the SOD power domain 340 operates in a sleep mode. For example, with respect to periodic activation threshold computation at intervals, the SOD power domain 340 may by duty cycled to operate in an active mode 1% (e.g., 100 ms ON) of the time (e.g., for computation) and operate in a sleep mode 99% (e.g., 10 s OFF) of the time (e.g., during intervals). The SOD power domain 340 also intermittently operates in the active mode (e.g., triggered by audio at the activation threshold) when it is processing audio data to determine whether the audio data includes speech like sounds. Updating the activation threshold to a level above current ambient noise may avoid unnecessarily waking of the SOD to perform speech onset detection.

The buffer power domain 360 is shown to include the buffer and the combiner. The buffer power domain 360 may operate in an active mode when the buffer is actively filling its buffer and may operate in a sleep mode when the buffer is maintaining stored audio data but not actively filling. With respect to periodic buffering at intervals, the buffer power domain 360 may be duty cycled to operate in an active mode 1% (e.g., 250 ms ON) of the time and operate in sleep mode 99% (25 s OFF) of the time. In some embodiments, the buffer power domain 360 may also operate in an active mode when the combiner performs stitching operations to combine leading noise with continuously passed audio data for the WUPD.

In embodiments, the WUPD power domain 380 operates in a sleep mode until it is triggered by the SOD to enter an active mode to process audio data for wake phrase detection. 99% percent of the time, the WUPD power domain 380 operates in a sleep mode but still may be erroneously awakened to the active mode due to false triggers by the SOD.

Figure 4:
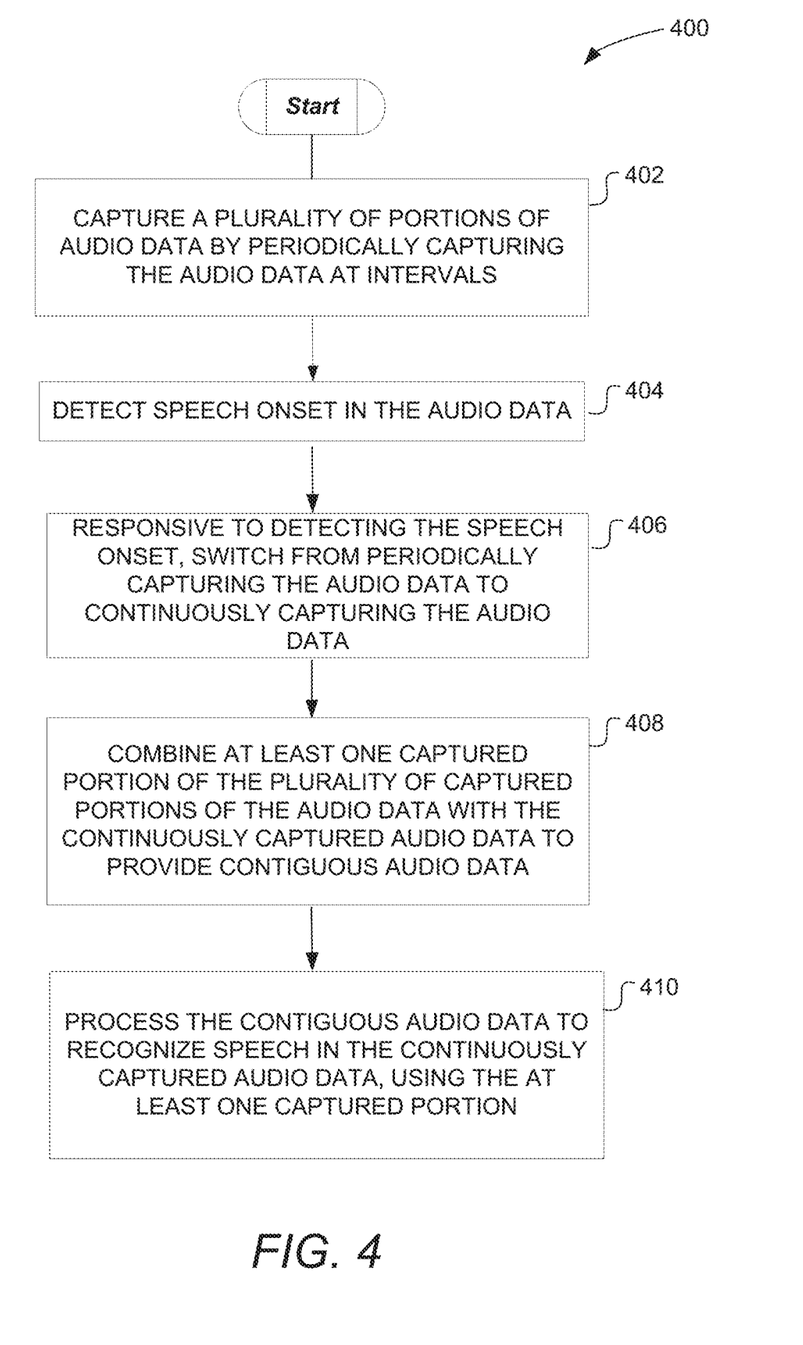
FIG. 4 is a flow diagram illustrating a method of periodically capturing audio data to provide contiguous audio data for speech recognition, in accordance with embodiments.
Figure 5:
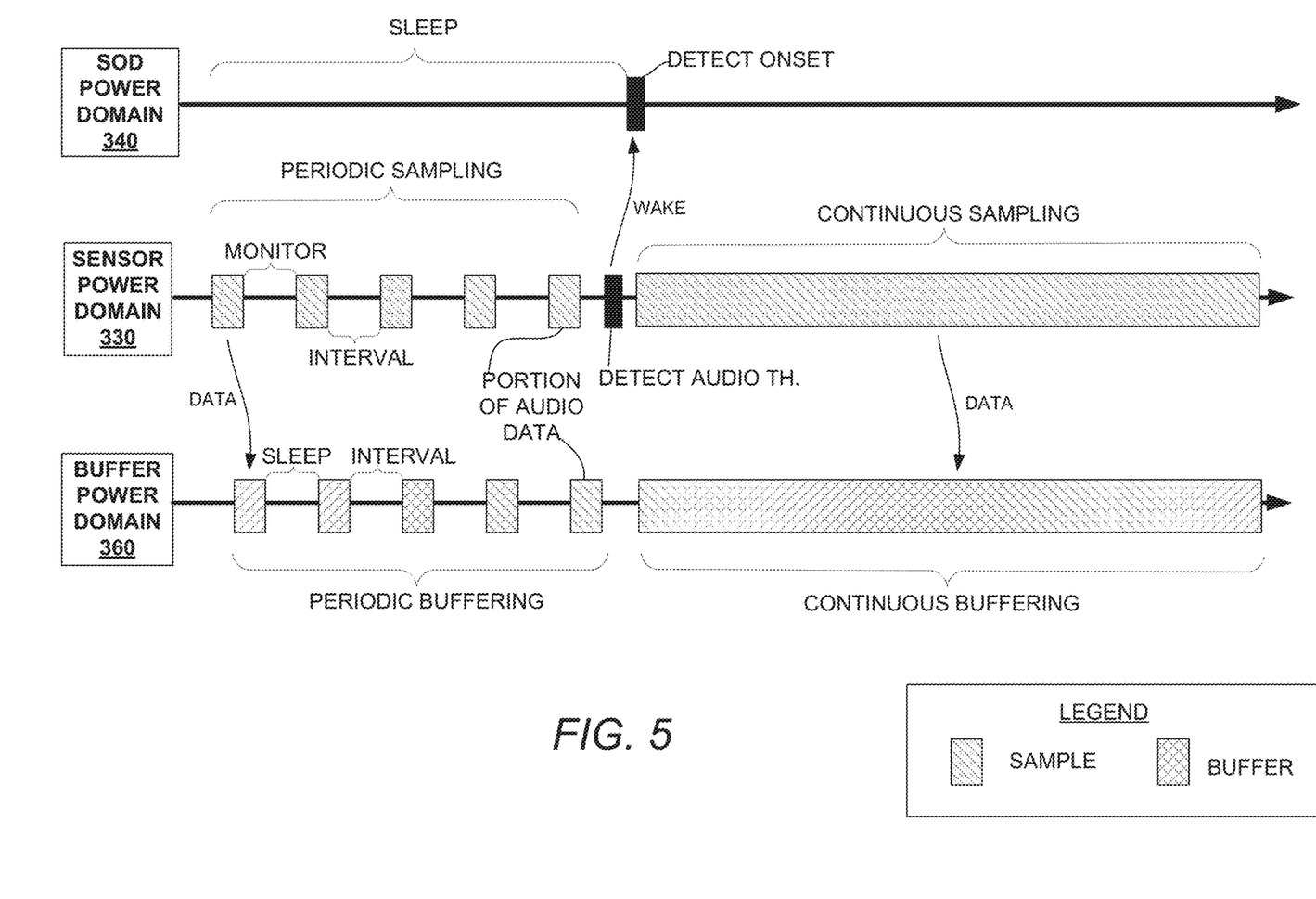
FIG. 5 is an interactive timing diagram illustrating periodic capture of audio data, in accordance with an embodiment.

FIG. 4 is a flow diagram illustrating a method of periodically capturing audio data (e.g., the leading noise) to provide contiguous audio data for speech recognition, in accordance with embodiments. The method 400 can be performed by processing logic comprising hardware (circuitry, dedicated logic, etc.), software (such as is run on a general-purpose computing system or a dedicated machine), firmware (embedded software), or any combination thereof. In various embodiments, the method 400 may be performed as shown and described with respect to FIGS. 2, 3, and 5. FIG. 5 is an interactive timing diagram illustrating periodic capture of audio data, in accordance with an embodiment.

For example, at block 402 components of the sensor power domain 330 and the buffer power domain 360 capture a first plurality of portions of audio data by periodically capturing the audio data at first intervals. Referring to FIG. 5, periodically capturing the audio data comprises operating the sensor power domain 330 in an active mode to sample the audio data and operating the buffer power domain in an active mode to buffer the sampled audio data. During the intervals, the sensor power domain 330 may operate in a lower power consumption (e.g., compared to its active mode) monitoring mode and the buffer power domain 360 may operate in a lower power consumption (e.g., compared to its active mode) sleep mode.

In embodiments, audio interface control 224 may set or dynamically adjust either or both intervals based on estimated noise characteristics of the environment or power consumption requirements of the audio processing device. For example, the intervals may be initially set during a manufacturing stage based on expected operating environment and conditions. Alternatively or additionally, the audio interface control 224 may during run-time monitor noise amplitudes, variation in noise, time of day, device location, battery power, and/or other measurements, perform corresponding analyses, and dynamically adjust the intervals to meet performance targets using the results of the analyses.

At block 404, components of the SOD power domain 340 detect speech onset in the audio data. As shown in FIG. 5, prior to detecting speech onset, the SOD power domain 340 may operate in a sleep mode. When audio data at the microphone array 220 meets or exceeds the activation threshold, the microphone array 220 wakes up the SOD 223 to execute a speech onset detection algorithm in order to determine whether speech like signals are present in the audio data.

It will be noted that the SOD 223 can detect the speech onset in the audio data without using the captured plurality of portions of the audio data. For example, the audio interface may sample the audio data for the periodically captured audio data at a first sample rate (e.g. 16 kHz) while sampling the audio data for SOD 223 analysis at a second sample rate (e.g., 4 kHz) that is less than the first sample rate. In an embodiment, the SOD 223 is a low latency SOD that is able to process a number of samples of audio data to detect speech onset and provide signals to wake the WUPD 228 and to initiate continuous capture of the audio data quickly enough to avoid an unacceptable amount of clipping. The number of samples of audio data may be selected to balance accuracy of speech onset detection with latency cause by processing.

At block 406, responsive to the detection of the speech onset, the sensor power domain 330 and the buffer power domain 360 are switched (e.g., by the audio interface control 224) from periodically capturing the audio data to continuously capturing the audio data. Referring to FIG. 5, continuously capturing the audio data may include continuously sampling the audio data and continuously buffering the sampled audio data. In an embodiment, continuously sampling and buffering means operating in an active mode to constantly sample and buffer audio data without any interval for operation in a sleep mode. Continuously buffering also may include using the buffer 225 as a channel to pass the continuously sampled audio data to the WUPD 228 for processing.

At block 408, the combiner 226 of the buffer power domain 360 combines at least one captured portion of the first plurality of captured portions of the audio data with the continuously captured audio data to provide contiguous audio data. For some embodiments, the combiner 226 uses an overlap-add window operating to append a portion of one end of the last captured portion of audio data with a portion of one end of the continuously captured audio data. In various embodiments, the portion of the one end of the last captured portion in the range of 1 ms to 20 ms but may be a shorter or longer duration. In some embodiments, the at least one captured portion of the first plurality of captured portions is the most recently captured portion of the first plurality of captured portions. In other embodiments, the at least one captured portion may include a representation of multiple captured portions and the combiner 226 may use the representation to generate the contiguous audio data. At block 410, components of the WUPD power domain 380 processes the contiguous audio data to recognize speech (e.g., a wake phrase) in the continuously captured audio data.

Figure 6:
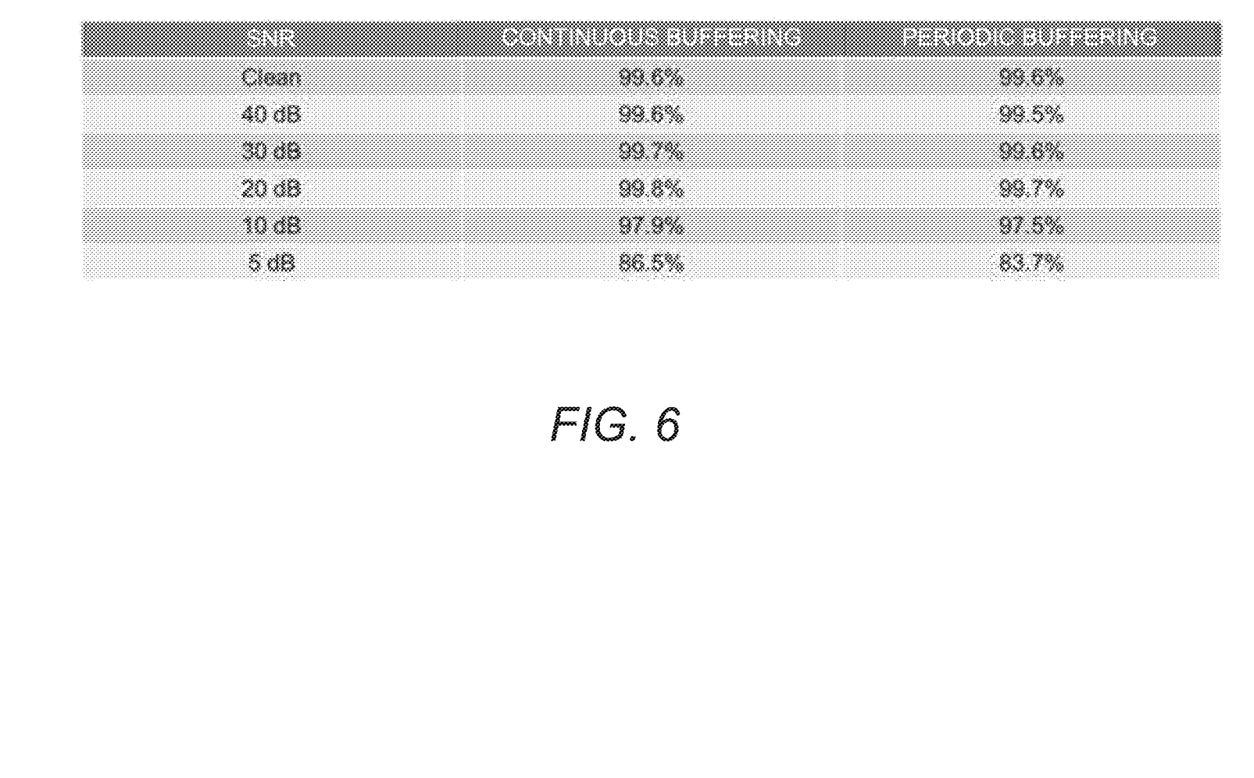
FIG. 6 is a chart diagram showing resulting percent recognition of a wake phrase, in accordance with embodiments.

FIG. 6 is a chart diagram showing resulting percent recognition of a wake phrase, in accordance with embodiments. The chart compares percent recognition achieved through the existing technique of continuously and repeatedly buffering leading noise to the percent recognition recognized achieved through the periodic buffering described in the embodiments. The percent recognition of the embodiments closely tracks those of the existing technique from a clean SNR to 20 dB, then start to separate at 10 dB. Thus, the periodic buffering described herein may provide similar percent recognition, while consuming less power than in traditional solutions.

In one embodiment, the approach of periodically capturing background noise illustrated above can be used in applications other than speech detection. For such applications, sensor input can be only periodically captured to conserve power until a higher-powered pattern recognition operation is triggered by an onset event. For example, image data may be periodically captured prior to a higher power consumption pattern recognition process (e.g., activity in a room) that uses both the periodically captured image data and a higher quality video stream. Further actions can be performed based on the result of the pattern recognition, such as recording audio, video, or still images, sending a notification, etc. In alternative embodiments, the higher-powered pattern recognition process may relate to changes in temperature, ambient light, environmental conditions, or any of a number of conditions or events that can be sensed.

Figure 7:
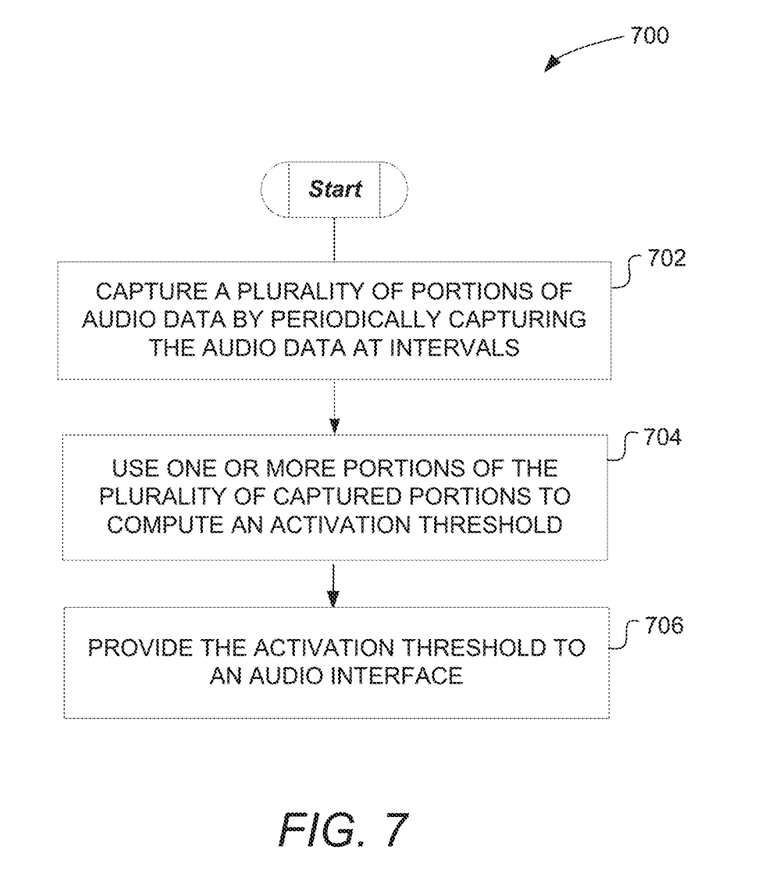
FIG. 7 is a flow diagram illustrating a method of periodic activation threshold computation, in accordance with embodiments.
Figure 8:
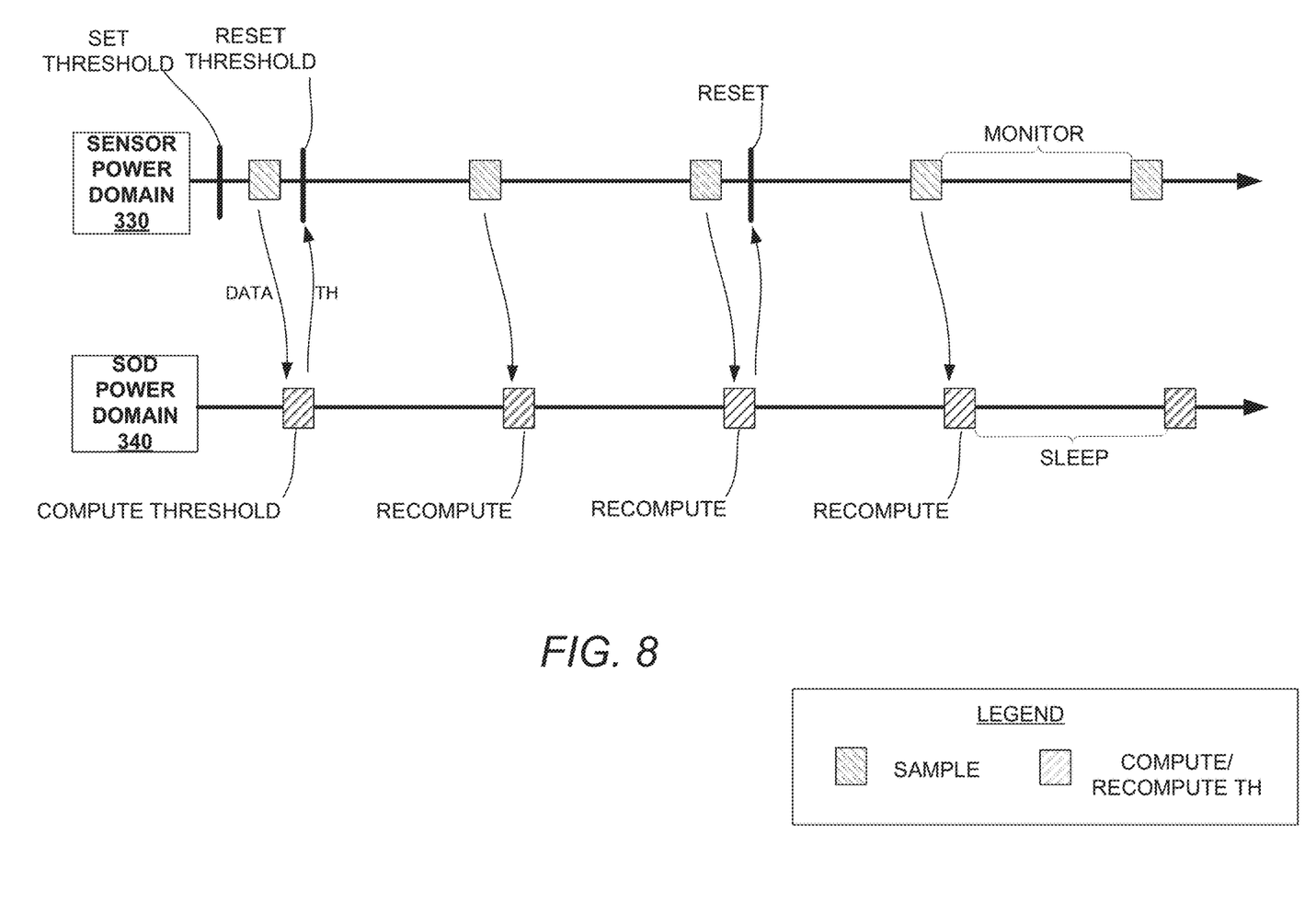
FIG. 8 is an interactive timing diagram illustrating periodic activation threshold computation, in accordance with embodiments.

FIG. 7 is a flow diagram illustrating a method 700 of periodic activation threshold computation, in accordance with embodiments, in accordance with an embodiment. The method 700 can be performed by processing logic comprising hardware (circuitry, dedicated logic, etc.), software (such as is run on a general-purpose computing system or a dedicated machine), firmware (embedded software), or any combination thereof. In various embodiments, the method 700 can be performed by the audio processing device of FIGS. 2, 3, and 8. FIG. 8 is an interactive timing diagram illustrating periodic activation threshold computation, in accordance with embodiments.

At block 702, components of the sensor power domain 330 capture a plurality of portions of the audio data by periodically capturing the audio data at intervals. At block 704, the threshold computation module 222 of the SOD power domain 340 uses one or more portions of the plurality of captured portions to compute an activation threshold. The sensor power domain 330 and the SOD power domain 340 may operate in an active mode to capture the plurality of portions of the audio data and to compute the activation threshold, respectively. During the intervals, the sensor power domain 330 may operate in a monitoring mode and the SOD power domain 340 may operate in a sleep mode, respectively. At block 706, the threshold computation module 222 of the SOD power domain 340 provides the activation threshold to the audio interface 221 or the microphone array 220 of the sensor power domain 330. The threshold computation module 222 need not reset the activation threshold in the microphone array 220. The threshold computation module may determine that the most recent ambient noise samples do not warrant a change in the activation threshold. On the other hand, the threshold computation module may determine, based on sampled ambient noise, that the activation threshold should be updated. For example, setting the activation threshold to a level above the ambient noise may avoid waking the SOD 223 to erroneously or unnecessarily consume power to process mere ambient noise for speech onset.

Figure 9:
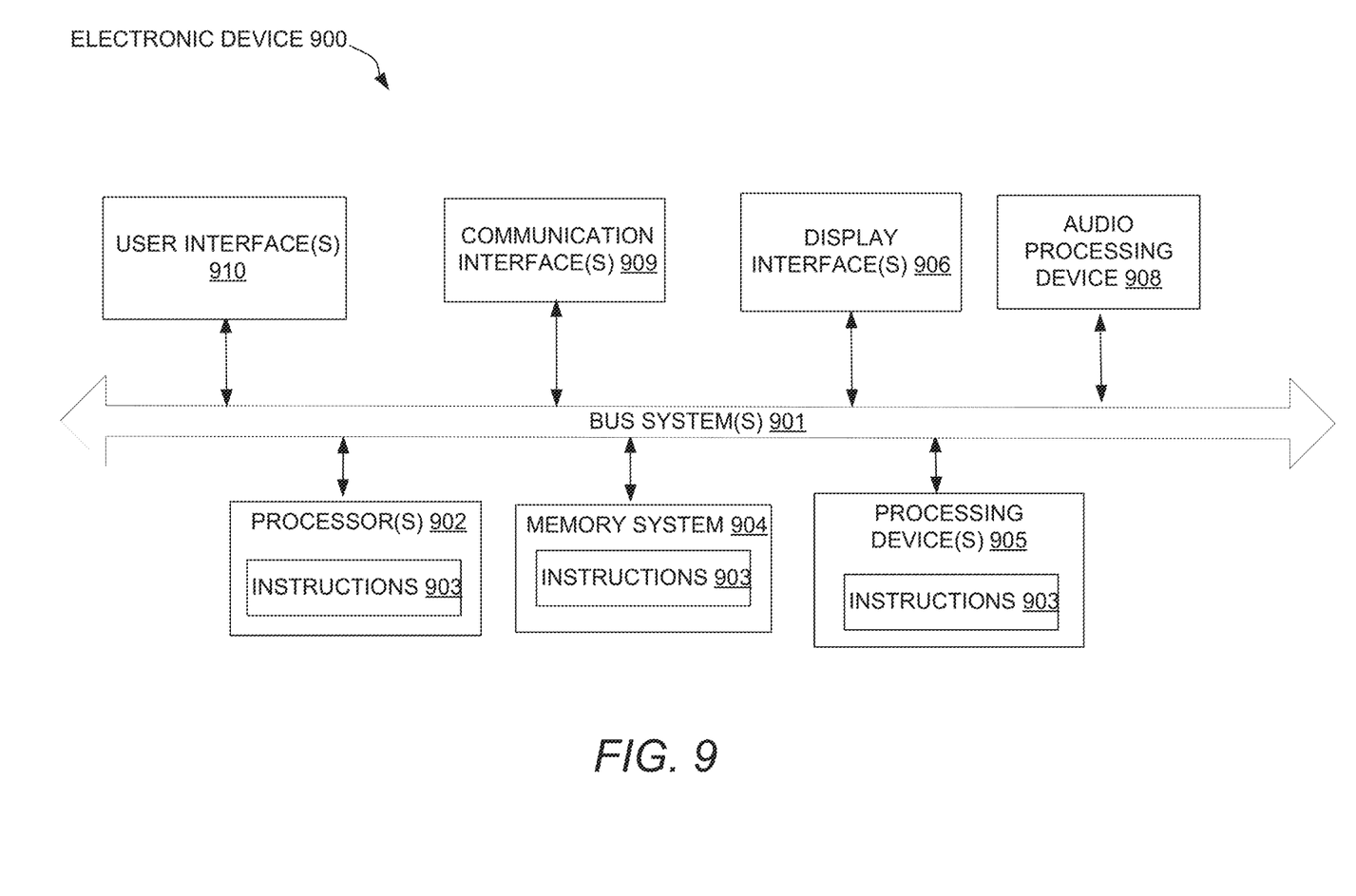
FIG. 9 is a block diagram illustrating an electronic device, in accordance with embodiments.

FIG. 9 is a block diagram illustrating an electronic device 900, in accordance with embodiments. The electronic device 900 may fully or partially include and/or operate the example embodiments of the audio processing device 102, the audio pattern source 104, the noise sources 106 and 108, the devices under control 103 and 110, and/or the pattern recognition application 112 of FIG. 1. The electronic device 900 may be in the form of a computer system within which sets of instructions may be executed to cause the electronic device 900 to perform any one or more of the methodologies discussed herein. The electronic device 900 may operate as a standalone device or may be connected (e.g., networked) to other machines. In a networked deployment, the electronic device 900 may operate in the capacity of a server or a client machine in server-client network environment, or as a peer machine in a P2P (or distributed) network environment.

The electronic device 900 may be an Internet of Things (IoT) device, a server computer, a client computer, a personal computer (PC), a tablet, a set-top box (STB), a VCH, a Personal Digital Assistant (PDA), a mobile telephone, a web appliance, a network router, switch or bridge, a television, speakers, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single electronic device 900 is illustrated, the term "device" shall also be taken to include any collection of machines that individually or jointly execute a set (or multiple sets) of instructions to perform any one or more of the methodologies discussed herein.

The electronic device 900 is shown to include processor(s) 902. In embodiments, the electronic device 900 and/or processors(s) 902 may include processing device(s) 905 such as a System on a Chip processing device, developed by Cypress Semiconductor Corporation, San Jose, Calif. Alternatively, the electronic device 900 may include one or more other processing devices known by those of ordinary skill in the art, such as a microprocessor or central processing unit, an application processor, a host controller, a controller, special-purpose processor, DSP, an application specific integrated circuit (ASIC), a field programmable gate array (FPGA), or the like. Bus system 901 may include a communication block (not shown) to communicate with an internal or external component, such as an embedded controller or an application processor, via communication interface(s) 909 and/or bus system 901.

Components of the electronic device 900 may reside on a common carrier substrate such as, for example, an integrated circuit (IC) die substrate, a multi-chip module substrate, or the like. Alternatively, components of the electronic device 900 may be one or more separate integrated circuits and/or discrete components.

The memory system 904 may include volatile memory and/or non-volatile memory which may communicate with one another via the bus system 901. The memory system 904 may include, for example, random access memory (RAM) and program flash. RAM may be static RAM (SRAM), and program flash may be a non-volatile storage, which may be used to store firmware (e.g., control algorithms executable by processor(s) 902 to implement operations described herein). The memory system 904 may include instructions 903 that when executed perform the methods described herein. Portions of the memory system 904 may be dynamically allocated to provide caching, buffering, and/or other memory based functionalities.

The memory system 904 may include a drive unit providing a machine-readable medium on which may be stored one or more sets of instructions 903 (e.g., software) embodying any one or more of the methodologies or functions described herein. The instructions 903 may also reside, completely or at least partially, within the other memory devices of the memory system 904 and/or within the processor(s) 902 during execution thereof by the electronic device 900, which in some embodiments, constitutes machine-readable media. The instructions 903 may further be transmitted or received over a network via the communication interface(s) 909.

While a machine-readable medium is in some embodiments a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The electronic device 900 is further shown to include display interface(s) 906 (e.g., a liquid crystal display (LCD), touchscreen, a cathode ray tube (CRT), and software and hardware support for display technologies), audio interface(s) 908 (e.g., microphones, speakers and software and hardware support for microphone input/output and speaker input/output). The electronic device 900 is also shown to include user interface(s) 910 (e.g., keyboard, buttons, switches, touchpad, touchscreens, and software and hardware support for user interfaces).

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:

1. An audio processing device, comprising:
an audio interface circuit operable to sample audio data;
a speech onset detector circuit;
a combiner circuit; and
an audio interface control circuit, wherein the audio interface circuit is operable to provide one or more first samples of the audio data to the speech onset detector circuit, wherein responsive to detection by the speech onset detector circuit of speech onset in the one or more first samples of the audio data, the audio interface control circuit is operable to switch the audio processing device from capturing second samples of the audio data at first intervals, to capturing the second samples of the audio data at second intervals, and wherein the combiner circuit is operable to provide contiguous audio data using at least one portion of the second samples of the audio data captured at the first intervals and the second samples of the audio data captured at the second intervals, wherein the capturing of the second samples of the audio data at the first intervals comprises the audio interface circuit sampling the audio data at a first sample rate and the detection by the speech onset detector circuit of speech onset in the one or more first samples of the audio data is based on capturing by the audio interface of the one or more first samples by sampling the audio data at a second sample rate, wherein the first sample rate is greater than the second sample rate.

2. The audio processing device of claim 1, further comprising a wake-up phrase detector circuit operable to process the contiguous audio data to recognize a wake phrase in the second samples of the audio data captured at the second intervals.

3. The audio processing device of claim 2, wherein the wake-up phrase detector circuit is operable to recognize the wake phrase using the at least one portion of the second samples of the audio data captured at the first intervals.

4. The audio processing device of claim 1, wherein the audio processing device is operable to capture the second samples of the audio data periodically according to the first intervals and capture the second samples of the audio data continuously according to the second intervals.

5. The audio processing device of claim 4, further comprising a buffer circuit operable to store the second samples of the audio data captured at the first intervals, wherein the buffer circuit is operable to operate in a sleep mode during each first interval.

6. The audio processing device of claim 1, wherein the audio interface circuit is operable to provide the one or more first samples of the audio data to the speech onset detector circuit responsive to sound waves meeting or exceeding a threshold activity level, wherein the audio data is representative of the sound waves.

7. The audio processing device of claim 6, wherein the speech onset detector circuit is configured to wake from a sleep mode in response to the one or more first samples of the audio data exceeding an activation threshold level.

8. The audio processing device of claim 6, wherein the audio processing device further comprises a threshold computation circuit operable to periodically calculate an updated threshold activity level and provide the updated threshold activity level to the audio interface circuit.

9. A method comprising:
providing one or more first samples of audio data responsive to sound waves meeting or exceeding a threshold activity level, wherein the audio data is representative of the sound waves;
detecting speech onset in the one or more first samples of the audio data;
responsive to detecting the speech onset, switching from capturing second samples of the audio data at first intervals to capturing the second samples of the audio data at second intervals, wherein the second intervals are shorter than the first intervals; and
providing contiguous audio data using the second samples of the audio data captured at the second intervals and at least one of the second samples of the audio data captured at the first intervals.

10. The method of claim 9, wherein the capturing of the second samples of the audio data at the second intervals comprises continuously capturing the second samples.

11. The method of claim 9, comprising turning on a speech onset detector circuit in response to the one or more first samples of the audio data exceeding an activation threshold level.

12. The method of claim 9, comprising calculating an updated threshold activity level and sampling the audio data based on the updated threshold activity level.

13. The method of claim 9 wherein the capturing the second samples of the audio data at first intervals comprises sampling the audio data at a first sample rate and the providing the one or more first samples of the audio comprises capturing the one or more first samples by sampling the audio data at a second sample rate, wherein the first sample rate is greater than the second sample rate.

14. An electronic communication device, comprising:
a microphone;
a communication interface circuit configured to wirelessly transmit and receive data; and
an audio processing device comprising
an audio interface circuit coupled to the microphone and
configured to sample audio data,
a speech onset detector circuit,
a combiner circuit,
a wake-up phrase detector circuit, and
an audio interface control circuit, wherein the audio interface circuit is operable to provide one or more first samples of the audio data to the speech onset detector circuit responsive to sound waves received at the microphone meeting or exceeding a threshold activity level, wherein the audio data is representative of the sound waves, wherein the speech onset detector circuit is configured to wake from a sleep mode in response to the one or more first samples of the audio data exceeding an activation threshold level, wherein responsive to detection by the speech onset detector circuit of speech onset in the one or more first samples of the audio data, the audio interface control circuit is operable to switch the audio interface circuit from sampling second samples of the audio data at first intervals, to sampling the second samples of the audio data at second intervals, wherein the combiner circuit is operable to provide contiguous audio data using at least one portion of the second samples of the audio data sampled at the first intervals and the second samples of the audio data sampled at the second intervals, the wake-up phrase detector circuit is configured to process the contiguous audio data to recognize a wake phrase, and wherein the communication interface circuit is configured to wirelessly transmit at least a portion of the second samples of the audio data sampled at the second intervals to a network, responsive to detection of the wake phrase.

15. The electronic communication device of claim 14, wherein each of the second intervals is less than each of the first intervals.

16. The electronic communication device of claim 14, wherein the audio interface circuit is configured to capture the second samples by sampling the audio data at a first sample rate and the audio interface is configured to capture the one or more first samples by sampling the audio data at a second sample rate, wherein the first sample rate is greater than the second sample rate.

17. The electronic communication device of claim 14, wherein the audio processing device further comprises a threshold computation circuit operable to periodically calculate an updated threshold activity level and provide the updated threshold activity level to the audio interface circuit.

* * * * *